United States Patent
Iriyama et al.

(10) Patent No.: US 9,859,589 B2
(45) Date of Patent: Jan. 2, 2018

(54) METHOD FOR PRODUCING SECONDARY BATTERY

(71) Applicant: NEC Corporation, Tokyo (JP)

(72) Inventors: Jiro Iriyama, Tokyo (JP); Makihiro Otohata, Tokyo (JP); Kazuaki Matsumoto, Tokyo (JP); Ikiko Shimanuki, Tokyo (JP)

(73) Assignee: NEC Corporation, Tokyo (JP)

( * ) Notice: Subject to any disclaimer, the term of this patent is extended or adjusted under 35 U.S.C. 154(b) by 18 days.

(21) Appl. No.: 15/103,402

(22) PCT Filed: Aug. 8, 2014

(86) PCT No.: PCT/JP2014/071018
§ 371 (c)(1),
(2) Date: Jun. 10, 2016

(87) PCT Pub. No.: WO2015/087580
PCT Pub. Date: Jun. 18, 2015

(65) Prior Publication Data
US 2016/0308252 A1  Oct. 20, 2016

(30) Foreign Application Priority Data
Dec. 11, 2013  (JP) ................... 2013-255971

(51) Int. Cl.
*H01M 10/052* (2010.01)
*H01M 10/0585* (2010.01)
(Continued)

(52) U.S. Cl.
CPC ......... *H01M 10/0585* (2013.01); *H01M 2/12* (2013.01); *H01M 2/36* (2013.01);
(Continued)

(58) Field of Classification Search
CPC ................. H01M 10/052; H01M 10/0525
See application file for complete search history.

(56) References Cited

U.S. PATENT DOCUMENTS

| 6,413,679 B1* | 7/2002 | Kuboki | H01M 2/1282 429/324 |
| 2003/0087160 A1* | 5/2003 | Suzuki | H01M 6/164 429/327 |
| 2011/0070485 A1* | 3/2011 | Kotato | H01M 10/056 429/199 |

FOREIGN PATENT DOCUMENTS

| JP | 2001-93580 | 4/2001 |
| JP | 2003-229112 | 8/2003 |

(Continued)

OTHER PUBLICATIONS

International Search Report and Written Opinion dated Nov. 4, 2014, in corresponding PCT International Application.

*Primary Examiner* — Olatunji Godo
(74) *Attorney, Agent, or Firm* — Finnegan, Henderson, Farabow, Garrett & Dunner, L.L.P.

(57) ABSTRACT

It is an object of the present invention to provide a method for producing a secondary battery in which water in the outer package can be removed even when the secondary battery includes an electrolytic solution containing a halogen-containing compound. The present exemplary embodiment is a method for producing a secondary battery including an electrolytic solution containing a supporting salt, a nonaqueous solvent, and a halogen-containing compound, an electrode assembly including a negative electrode and a positive electrode, and an outer package, the method including (1) disposing a first solution containing at least the supporting salt and the nonaqueous solvent, and the electrode assembly in the outer package; (2) charging the electrode assembly; (3) emitting from the outer package a gas generated by the
(Continued)

charge; and (4) injecting a second solution including at least the halogen-containing compound into the outer package after the gas is emitted, wherein the first solution does not contain the halogen-containing compound, and the electrolytic solution includes the first solution and the second solution.

17 Claims, 2 Drawing Sheets

(51) Int. Cl.
*H01M 10/0569* (2010.01)
*H01M 10/058* (2010.01)
*H01M 10/05* (2010.01)
*H01M 2/12* (2006.01)
*H01M 2/36* (2006.01)
*H01M 10/44* (2006.01)

(52) U.S. Cl.
CPC ........... *H01M 2/361* (2013.01); *H01M 2/362* (2013.01); *H01M 2/365* (2013.01); *H01M 10/05* (2013.01); *H01M 10/058* (2013.01); *H01M 10/0569* (2013.01); *H01M 10/446* (2013.01)

(56) References Cited

FOREIGN PATENT DOCUMENTS

| | | |
|---|---|---|
| JP | 2004-349011 | 12/2004 |
| JP | 2006-294282 | 10/2006 |
| JP | 2010-272492 | 12/2010 |
| JP | 2012-43691 | 3/2012 |
| JP | 2013-110017 | 6/2013 |
| JP | 2013-149477 | 8/2013 |
| WO | WO 2013/076847 A1 | 5/2013 |

* cited by examiner

METHOD FOR PRODUCING SECONDARY BATTERY

CROSS-REFERENCE TO RELATED PATENT APPLICATIONS

This application is a National Stage Entry of International Application No. PCT/JP2014/071018, filed Aug. 8, 2014, which claims priority from Japanese Patent Application No. 2013-255971, filed Dec. 11, 2013. The entire contents of the above-referenced applications are expressly incorporated herein by reference.

TECHNICAL FIELD

The present invention relates to a method for producing a secondary battery.

BACKGROUND ART

With the rapid expansion of markets for mobile type tablet terminals, smartphones, electric vehicles, stationary electricity storage systems, and the like, secondary batteries having excellent performance are required.

A method for producing a secondary battery is known in which after initial charge after a secondary battery is produced, the outer package is opened to vent the gas generated during the initial charge, and then the package is sealed again. By decomposing water that is included in a battery by initial charge and removing the generated gas from the package by this method, the effect of the water in the battery can be reduced.

For example, Patent Literature 1 discloses a method for producing a sheet type battery in which a gas generated during initial charge can be simply vented.

In addition, Patent Literature 2 discloses a method for producing a secondary battery by disposing electrodes and the like in a container, then removing water from the container, and subsequently preventing water from entering the container.

In addition, Patent Literature 3 discloses a method for producing a secondary battery, including a step of injecting an electrolytic solution, a step of initial charging, an aging step of storing in a predetermined temperature range, a pressing step, and a degassing and sealing step of venting a gas in an outer package made of sheet and sealing the package.

In addition, Patent Literature 4 discloses a method for producing a secondary battery, including a first injection step of injecting a first electrolytic solution containing a particular carbonate compound, a first charging step, a second injection step of injecting a second electrolytic solution containing a cyclic sulfonate, and a second charging step. It is described that by this, a film derived from the first electrolytic solution and a film derived from the second electrolytic solution are formed on a negative electrode active material layer in this order, and as a result, a secondary battery having excellent cycle characteristics is obtained.

In addition, Patent Literature 5 discloses a secondary battery including an opening and closing vent portion for releasing a gas generated by the decomposition of a nonaqueous electrolyte by charge and discharge. In addition, Patent Literature 6 describes a method of injecting an electrolytic solution in a plurality of portions.

CITATION LIST

Patent Literature

Patent Literature 1: JP2001-093580A
Patent Literature 2: JP2004-349011A
Patent Literature 3: JP2013-149477A
Patent Literature 4: JP2013-110017A
Patent Literature 5: JP2003-229112A
Patent Literature 6: JP2012-043691A

SUMMARY OF INVENTION

Technical Problem

As described above, a method for producing a secondary battery is known in which water is decomposed by initial charge, and then the generated gas is removed from the package to reduce the effect of water in the battery.

But, when an electrolytic solution containing a halogen-containing compound (particularly, a halogen-containing carbonate compound, a halogen-containing ether compound, or a halogen-containing ester compound) is used, the degree of decomposition of water in initial charge tends to be reduced, and therefore even if the above method is applied, a large amount of water may remain in the package. When a large amount of water remains in the package, the cycle characteristics of the battery may be influenced.

Therefore, it is an object of the present invention to provide a method for producing a secondary battery in which water in an outer package can be removed even when a secondary battery including an electrolytic solution containing a halogen-containing compound is produced.

Solution to Problem

One of the present exemplary embodiments is a method for producing a secondary battery comprising an electrolytic solution comprising a supporting salt, a nonaqueous solvent, and a halogen-containing compound, an electrode assembly comprising a negative electrode and a positive electrode, and an outer package, the method comprising:

(1) disposing a first solution comprising at least the supporting salt and the nonaqueous solvent, and the electrode assembly in the package;
(2) charging the electrode assembly;
(3) emitting from the package a gas generated by the charge; and
(4) injecting a second solution comprising at least the halogen-containing compound into the package after the gas is emitted, wherein the first solution does not comprise the halogen-containing compound, and
the electrolytic solution comprises the first solution and the second solution.

One of the present exemplary embodiments is a secondary battery fabricated by the above method for producing a secondary battery.

Advantageous Effect of Invention

According to the present exemplary embodiment, a method for producing a secondary battery in which water in an outer package can be removed even when a secondary battery including an electrolytic solution containing a halogen-containing compound is produced can be provided.

DESCRIPTION OF EMBODIMENTS

Figure 1:
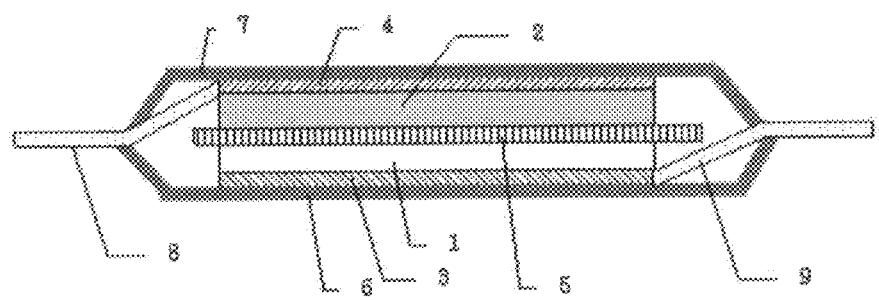
FIG. 1 is a schematic cross-sectional view showing an example of the configuration of a secondary battery.

Exemplary embodiments will be described below.

A secondary battery obtained by a production method according to the present exemplary embodiment includes at least an electrolytic solution, a negative electrode, a positive electrode, and an outer package.

In the production method according to the present exemplary embodiment, first, a first solution containing at least a supporting salt and a solvent, and an electrode assembly including a negative electrode and a positive electrode are disposed in an outer package. Here, the first solution does not contain a halogen-containing compound. When a halogen-containing compound is contained in the solution, wettability between the solution and the electrodes decreases, and the area of the electrode portions not contributing to the reaction increases, and therefore the degree of decomposition of water during initial charge tends to be reduced. Particularly, when a halogen-containing carbonate compound, a halogen-containing ether compound, or a halogen-containing ester compound is contained, the decomposition of water during initial charge is inhibited. Therefore, a halogen-containing compound is not added to the first solution.

Next, the electrode assembly disposed in the package is charged (charging step). By this charge (initial charge), water included in the package, that is, water mainly included in the negative electrode and the positive electrode, is decomposed into hydrogen and oxygen. This charging step may be performed in a state in which the package is sealed or in a state in which the package is opened. But, the charging step is preferably performed in a state in which the package is sealed.

The gas generated by the charge is emitted from the package (emitting step). The step can be performed, for example, by opening the package. In addition, an opening may be provided in part of the package to emit the gas. In addition, the package which is opened or where an opening is formed may be placed under reduced pressure as needed. In addition, the gas may be emitted during the charging step, and, for example, when the charging step is performed in a state in which the package is opened, at least part of the gas is emitted during the charging step.

After the gas is emitted from the package, a second solution containing at least a halogen-containing compound is injected into the package.

The electrolytic solution formed of the first solution and the second solution, which are injected into the package. The halogen-containing compound is included in the second solution, and therefore by adding the second solution to the first solution, the electrolytic solution containing the halogen-containing compound can be obtained.

By the configuration in the present exemplary embodiment, even when a secondary battery including an electrolytic solution containing a halogen-containing compound is produced, water in the package can be removed to produce the secondary battery.

Configuration requirements in the present exemplary embodiment will be described below.

[1] Electrolytic Solution

In the present exemplary embodiment, the electrolytic solution contains a supporting salt, a nonaqueous solvent, and a halogen-containing compound, and includes a first solution containing at least a supporting salt and a nonaqueous solvent and a second solution containing at least a halogen-containing compound as described above. By not adding a halogen-containing compound to the first solution, water can be efficiently removed during initial charge.

<First Solution>

The first solution contains a supporting salt and a nonaqueous solvent and does not contain a halogen-containing compound. Examples of the halogen-containing compound include halogen-containing carbonate compounds, halogen-containing ether compounds, or halogen-containing ester compounds.

The supporting salt is not particularly limited. Examples thereof include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, and $LiN(CF_3SO_2)_2$. One supporting salt can be used alone, or two or more supporting salts can be used in combination.

The concentration of the supporting salt in the first solution is preferably 0.5 to 1.5 mol/L. By setting the concentration of the supporting salt in this range, the density, viscosity, electrical conductivity, and the like are easily adjusted in suitable ranges.

The nonaqueous solvent is not particularly limited but is preferably a compound not having a halogen atom (non-halogenated compound). Examples of the nonaqueous solvent include carbonates such as cyclic carbonates and chain carbonates, aliphatic carboxylates, γ-lactones, cyclic ethers, and chain ethers (none of these have a halogen atom; non-halogenated). The nonaqueous solvent can be used alone, or two or more of these can be used in combination.

Examples of the cyclic carbonates (non-halogenated) include propylene carbonate (PC), ethylene carbonate (EC), butylene carbonate (BC), and vinylene carbonate (VC). The nonaqueous solvent may or may not contain vinylene carbonate (VC).

Examples of the chain carbonates (non-halogenated) include dimethyl carbonate (DMC), diethyl carbonate (DEC), ethyl methyl carbonate (EMC), and dipropyl carbonate (DPC).

Examples of the aliphatic carboxylates (non-halogenated) include methyl formate, methyl acetate, and ethyl propionate.

Examples of the γ-lactones (non-halogenated) include γ-butyrolactone.

Examples of the cyclic ethers (non-halogenated) include tetrahydrofuran and 2-methyltetrahydrofuran.

Examples of the chain ethers (non-halogenated) include 1,2-diethoxyethane (DEE) and ethoxymethoxyethane (EME).

In addition, examples of the nonaqueous solvent include dimethyl sulfoxide, 1,3-dioxolane, formamide, acetamide, dimethylformamide, acetonitrile, propylnitrile, nitromethane, ethyl monoglyme, phosphate triesters, trimethoxymethane, dioxolane derivatives, sulfolane, methylsulfolane, 1, 3-dimethyl-2-imidazolidinone, 3-methyl-2-oxazolidinone, propylene carbonate derivatives, tetrahydrofuran derivatives, ethyl ether, and N-methylpyrrolidone. One of these can be used alone, or two or more of these can be used in combination.

The nonaqueous solvent preferably contains a non-halogenated carbonate. The non-halogenated carbonates include non-halogenated cyclic carbonates or non-halogenated chain carbonates. Advantages of the non-halogenated carbonates are that the relative dielectric constant is large, and therefore the ion dissociation properties of the electrolytic solution improve, and further the viscosity of the electrolytic solution decreases, and therefore the ion mobility improves. The content of the non-halogenated carbonate in the electrolytic solution is, for example, 30% by mass or more, preferably 50% by mass or more, and more preferably 70% by mass or more.

<Second Solution>

The second solution contains a halogen-containing compound. As the halogen-containing compound, examples of the halogen-containing compound include halogen-containing carbonate compounds, halogen-containing ether compounds, or halogen-containing ester compounds. One of these can be used alone, or two or more of these can be used in combination. In other words, the halogen-containing compound is preferably at least one selected from the group consisting of a halogen-containing carbonate compound, a halogen-containing ether compound, and a halogen-containing ester compound.

The second solution may contain a supporting salt and may contain a nonaqueous solvent like the first solution. In addition, the second solution may contain only the halogen-containing compound.

In addition, the second solution preferably contains the same supporting salt and nonaqueous solvent as those in the first solution. In addition, the content (concentration) of each of the supporting salt and the nonaqueous solvent in the second solution is preferably the same as that in the first solution.

The content of the halogen-containing compound in the second solution is, for example, larger than 5% by mass. In addition, the content of the halogen-containing compound is preferably 6% by mass or more, more preferably 10% by mass or more, and further preferably 15% by mass or more. By setting the content of the halogen-containing compound at 6% by mass or more, the amount of the second solution injected can be decreased, and therefore the amount of the first solution injected can be increased. As a result, initial charge can be effectively performed.

The content of the halogen-containing compound in the second solution is, for example, 100% by mass or less. In addition, the content of the halogen-containing compound is preferably 50% by mass or less, more preferably 40% by mass or less, and further preferably 30% by mass or less. By setting the content of the halogen-containing compound at 50% by mass or less, the amount of the second solution injected can be moderately increased, and the distribution of the halogen-containing compound in the electrolytic solution easily becomes uniform.

{"First solution"/("first solution"+"second solution")} is preferably 6/10 or more, more preferably 7/10 or more, and further preferably 8/10 or more from the viewpoint of water removal during initial charge. In addition, {"first solution"/("first solution"+"second solution")} is preferably 9/10 or less from the viewpoint of ensuring a space where the second solution is added.

The concentration of the supporting salt in the electrolytic solution is preferably 0.5 to 1.5 mol/L. By setting the concentration of the supporting salt in this range, the density, viscosity, electrical conductivity, and the like are easily adjusted in suitable ranges.

The content of the halogen-containing compound in the electrolytic solution is preferably 0.1 to 10% by mass, more preferably 0.2 to 8% by mass, and further preferably 0.5 to 5% by mass.

[Halogen-Containing Carbonate Compound]

The halogen-containing carbonate compound is a compound having a structure in which some or all of the hydrogen atoms of a carbonate compound having a carbonate group (—OCOO—) are replaced by halogen atoms. The halogen-containing carbonate compound includes cyclic and chain ones. Specific examples include cyclic halogen-containing carbonate compounds (for example, cyclic fluorine-containing carbonate compounds) and chain halogen-containing carbonate compounds (for example, chain fluorine-containing carbonate compounds). In addition, the halogen-containing carbonate compound is preferably a fluorine-containing carbonate compound and is preferably a cyclic fluorine-containing carbonate compound or a chain fluorine-containing carbonate compound.

The cyclic fluorine-containing carbonate compound is not particularly limited. Examples thereof include compounds having structures in which some or all of the hydrogen atoms of ethylene carbonate (EC), propylene carbonate (PC), butylene carbonate (BC), vinylene carbonate (VC), or vinyl ethylene carbonate are replaced by fluorine atoms. As the cyclic fluorine-containing carbonate compound, for example, fluoroethylene carbonate (hereinafter also referred to as FEC) such as 4-fluoro-1,3-dioxolan-2-one, (cis or trans)4,5-difluoro-1,3-dioxolan-2-one, 4,4-difluoro-1,3-dioxolan-2-one, 4-fluoro-5-methyl-1,3-dioxolan-2-one, and trifluoropropylene carbonate (TFPC) can be used. Among these, fluoroethylene carbonate (FEC) is preferred from the viewpoint of the cycle characteristics of the secondary battery.

The chain fluorine-containing carbonate compound is not particularly limited. Examples thereof include compounds having structures in which some or all of the hydrogen atoms of dimethyl carbonate, diethyl carbonate, ethyl methyl carbonate, dipropyl carbonate, or methyl propyl carbonate are replaced by fluorine atoms. More specific examples of the chain fluorine-containing carbonate compound include bis (fluoroethyl) carbonate, 3-fluoropropyl methyl carbonate, 3,3,3-trifluoropropyl methyl carbonate, bis(trifluoromethyl) carbonate (di(trifluoromethyl) carbonate), bis(trifluoroethyl) carbonate, and trifluoroethyl methyl carbonate.

The content of the fluorine-containing carbonate compound in the electrolytic solution is, for example, preferably 0.1 to 10% by mass, more preferably 0.2 to 8% by mass, and further preferably 0.5 to 5% by mass.

From the viewpoint of the cycle characteristics of the secondary battery, preferred examples of the cyclic fluorine-containing carbonate compound include compounds represented by the following formula (1-1):

[Formula 1]

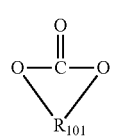

(1-1)

wherein $R_{101}$ is a fluorine-substituted alkylene group or a fluorine-substituted alkenylene group.

The fluorine-substituted alkylene group represents a substituted alkylene group having a structure in which some or all of the hydrogen atoms of an unsubstituted alkylene group are replaced by fluorine atoms. The fluorine-substituted alkenylene group represents a substituted alkenylene group having a structure in which some or all of the hydrogen atoms of an unsubstituted alkenylene group are replaced by fluorine atoms.

In formula (1-1), the fluorine-substituted alkylene group or the fluorine-substituted alkenylene group includes linear, branched, or cyclic ones. The fluorine-substituted alkylene group is preferably linear or branched. The fluorine-substituted alkenylene group is preferably linear or branched.

The number of carbon atoms of the fluorine-substituted alkylene group is preferably 2 to 8, more preferably 2 to 6, and further preferably 2 to 4.

The number of carbon atoms of the fluorine-substituted alkenylene group is preferably 2 to 8, more preferably 2 to 6, and further preferably 2 to 4.

The cyclic fluorine-containing carbonate compound also includes those overlapping the above. Examples of the cyclic fluorine-containing carbonate compound include the following compounds:

Fluoroethylene carbonate (FEC) such as 4-fluoro-1,3-dioxolan-2-one, 4,4-difluoro-1,3-dioxolan-2-one, 4,5-difluoro-1,3-dioxolan-2-one, and 4,5-difluoro-1,3-dioxolan-2-one.

Fluoropropylene carbonate such as 4-fluoromethyl-1,3-dioxolan-2-one, 4-difluoromethyl-1,3-dioxolan-2-one, 4-trifluoromethyl-1,3-dioxolan-2-one, 4-fluoro-4-methyl-1,3-dioxolan-2-one, 4-fluoro-4-fluoromethyl-1,3-dioxolan-2-one, 4-fluoro-4-difluoromethyl-1,3-dioxolan-2-one, 4-fluoro-4-trifluoromethyl-1,3-dioxolan-2-one, 5-fluoro-4-methyl-1,3-dioxolan-2-one, 5-fluoro-4-fluoromethyl-1,3-dioxolan-2-one, 5-fluoro-4-difluoromethyl-1,3-dioxolan-2-one, 5-fluoro-4-trifluoromethyl-1,3-dioxolan-2-one, 4,5-difluoro-4-trifluoromethyl-1,3-dioxolan-2-one, and 4,5,5-difluoro-4-trifluoromethyl-1,3-dioxolan-2-one.

Fluorobutylene carbonate such as 4-(2-fluoroethyl)-1,3-dioxolan-2-one, 4-(2,2-difluoroethyl)-1,3-dioxolan-2-one, 4-(2,2,2-trifluoroethyl)-1,3-dioxolan-2-one, 4-(1-fluoroethyl)-1,3-dioxolan-2-one, 4-(1,1-difluoroethyl)-1,3-dioxolan-2-one, 4-(1,2-difluoroethyl)-1,3-dioxolan-2-one, 4-(1,1,2-trifluoroethyl)-1,3-dioxolan-2-one, 4-(1,1,2,2-tetrafluoroethyl)-1,3-dioxolan-2-one, 4-(1,1,2,2,2-pentafluoroethyl)-1,3-dioxolan-2-one, 4-fluoro-4-(2-fluoroethyl)-1,3-dioxolan-2-one, 4-fluoro-4-(2,2-difluoroethyl)-1,3-dioxolan-2-one, 4-fluoro-4-(2,2,2-trifluoroethyl)-1,3-dioxolan-2-one, 4-fluoro-4-(1-fluoroethyl)-1,3-dioxolan-2-one, 4-fluoro-4-(1,1-difluoroethyl)-1,3-dioxolan-2-one, 4-fluoro-4-(1,2-difluoroethyl)-1,3-dioxolan-2-one, 4-fluoro-4-(1,1,2-trifluoroethyl)-1,3-dioxolan-2-one, 4-fluoro-4-(1,1,2,2-tetrafluoroethyl)-1,3-dioxolan-2-one, 4-fluoro-4-(1,1,2,2,2-pentafluoroethyl)-1,3-dioxolan-2-one, 5-fluoro-4-(2-fluoroethyl)-1,3-dioxolan-2-one, 5-fluoro-4-(2,2-difluoroethyl)-1,3-dioxolan-2-one, 5-fluoro-4-(2,2,2-trifluoroethyl)-1,3-dioxolan-2-one, 5-fluoro-4-(1-fluoroethyl)-1,3-dioxolan-2-one, 5-fluoro-4-(1,1-difluoroethyl)-1,3-dioxolan-2-one, 5-fluoro-4-(1,2-difluoroethyl)-1,3-dioxolan-2-one, 5-fluoro-4-(1,1,2-trifluoroethyl)-1,3-dioxolan-2-one, 5-fluoro-4-(1,1,2,2-tetrafluoroethyl)-1,3-dioxolan-2-one, 5-fluoro-4-(1,1,2,2,2-pentafluoroethyl)-1,3-dioxolan-2-one, 4,5-difluoro-4-(2-fluoroethyl)-1,3-dioxolan-2-one, 4,5-difluoro-4-(2,2-difluoroethyl)-1,3-dioxolan-2-one, 4,5-difluoro-4-(2,2,2-trifluoroethyl)-1,3-dioxolan-2-one, 4,5-difluoro-4-(1-fluoroethyl)-1,3-dioxolan-2-one, 4,5-difluoro-4-(1,1-difluoroethyl)-1,3-dioxolan-2-one, 4,5-difluoro-4-(1,2-difluoroethyl)-1,3-dioxolan-2-one, 4,5-difluoro-4-(1,1,2-trifluoroethyl)-1,3-dioxolan-2-one, 4,5-difluoro-4-(1,1,2,2-tetrafluoroethyl)-1,3-dioxolan-2-one, 4,5-difluoro-4-(1,1,2,2,2-pentafluoroethyl)-1,3-dioxolan-2-one, 5,5-difluoro-4-(2-fluoroethyl)-1,3-dioxolan-2-one, 5,5-difluoro-4-(2,2-difluoroethyl)-1,3-dioxolan-2-one, 5,5-difluoro-4-(2,2,2-trifluoroethyl)-1,3-dioxolan-2-one, 5,5-difluoro-4-(1-fluoroethyl)-1,3-dioxolan-2-one, 5,5-difluoro-4-(1,1-difluoroethyl)-1,3-dioxolan-2-one, 5,5-difluoro-4-(1,2-difluoroethyl)-1,3-dioxolan-2-one, 5,5-difluoro-4-(1,1,2-trifluoroethyl)-1,3-dioxolan-2-one, 5,5-difluoro-4-(1,1,2,2-tetrafluoroethyl)-1,3-dioxolan-2-one, 5,5-difluoro-4-(1,1,2,2,2-pentafluoroethyl)-1,3-dioxolan-2-one, 4,5,5-trifluoro-4-(2-fluoroethyl)-1,3-dioxolan-2-one, 4,5,5-trifluoro-4-(2,2-difluoroethyl)-1,3-dioxolan-2-one, 4,5,5-trifluoro-4-(2,2,2-trifluoroethyl)-1,3-dioxolan-2-one, 4,5,5-trifluoro-4-(1-fluoroethyl)-1,3-dioxolan-2-one, 4,5,5-trifluoro-4-(1,1-difluoroethyl)-1,3-dioxolan-2-one, 4,5,5-trifluoro-4-(1,2-difluoroethyl)-1,3-dioxolan-2-one, 4,5,5-trifluoro-4-(1,1,2-trifluoroethyl)-1,3-dioxolan-2-one, 4,5,5-trifluoro-4-(1,1,2,2-tetrafluoroethyl)-1,3-dioxolan-2-one, and 4,5,5-trifluoro-4-(1,1,2,2,2-pentafluoroethyl)-1,3-dioxolan-2-one.

Fluorovinylene carbonate such as 4-fluoro-1,3-dioxol-2-one and 4,4-difluoro-1,3-dioxol-2-one.

One of these cyclic fluorine-containing carbonate compounds may be used alone, or two or more of these cyclic fluorine-containing carbonate compounds may be used in combination.

From the viewpoint of the cycle characteristics of the secondary battery, preferred examples of the chain fluorine-containing carbonate compound include compounds represented by the following formula (1-2):

[Formula 2]

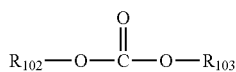

(1-2)

wherein $R_{102}$ and $R_{103}$ each independently represent an alkyl group or a fluorine-substituted alkyl group, and at least one of $R_{102}$ and $R_{103}$ is a fluorine-substituted alkyl group.

The fluorine-substituted alkyl group represents a substituted alkyl group having a structure in which some or all of the hydrogen atoms of an unsubstituted alkyl group are replaced by fluorine atoms.

In formula (1-2), the alkyl group or the fluorine-substituted alkyl group includes linear, branched, or cyclic ones. The alkyl group is preferably linear or branched. The fluorine-substituted alkyl group is preferably linear or branched.

In $R_{102}$ and $R_{103}$, the number of carbon atoms of the alkyl group or the fluorine-substituted alkyl group is each independently preferably 1 to 8, more preferably 1 to 6, further preferably 1 to 4, and particularly preferably 1 to 3.

For example, $R_{102}$ and $R_{103}$ are each independently a fluorine-substituted alkyl group. In addition, for example, $R_{102}$ is an alkyl group, and $R_{103}$ is a fluorine-substituted alkyl group. In addition, for example, $R_{102}$ is a fluorine-substituted alkyl group, and $R_{103}$ is an alkyl group.

The chain fluorine-containing carbonate compound also includes those overlapping the above. Examples of the chain fluorine-containing carbonate compound include methyl-2, 2,2-trifluoroethyl carbonate, ethyl-2,2,2-trifluoroethyl carbonate, methyl 2,2,3,3,3-pentafluoropropyl carbonate, methyl 3,3,3-trifluoropropyl carbonate, methyl 2,2,3,3,4,4,4-heptafluorobutyl carbonate, 2,2,2-trifluoroethyl 2,2,3,3,3-pentafluoropropyl carbonate, fluoromethyl methyl carbonate, (difluoromethyl) methyl carbonate, bis(fluoromethyl) carbonate, (1-fluoroethyl) methyl carbonate, (2-fluoroethyl) methyl carbonate, ethyl fluoromethyl carbonate, (1-fluoroethyl) fluoromethyl carbonate, (2-fluoroethyl) fluoromethyl carbonate, (1,2-difluoroethyl) methyl carbonate, (1,1-difluoroethyl) methyl carbonate, (1-fluoroethyl) ethyl carbonate, (2-fluoroethyl) ethyl carbonate, ethyl (1,1-difluoroethyl) carbonate, ethyl (1,2-difluoroethyl) carbonate, bis(1-fluoroethyl) carbonate, bis(2-fluoroethyl) carbonate, and (1-fluoroethyl) (2-fluoroethyl) carbonate. One chain fluorine-containing carbonate compound may be used alone, or two or more chain fluorine-containing carbonate compounds may be used in combination.

[Halogen-Containing Ether Compound]

The halogen-containing ether compound is a compound having a structure in which some or all of the hydrogen atoms of an ether compound having an ether group (—O—) are replaced by halogen atoms. The halogen-containing ether compound includes cyclic and chain ones. Specific examples include chain halogen-containing ether compounds (for example, chain fluorine-containing ether compounds) and cyclic halogen-containing ether compounds (for example, cyclic fluorine-containing ether compounds).

The chain fluorine-containing ether compounds are, for example, compounds having structures in which some or all of the hydrogen atoms of chain ether compounds such as dimethyl ether, diethyl ether, ethyl methyl ether, 1,2-diethoxyethane (DEE), and ethoxymethoxyethane (EME) are replaced by fluorine atoms.

From the viewpoint of the cycle characteristics of the secondary battery, preferred examples of the chain fluorine-containing ether compounds include compounds represented by the following formula (2-1):

[Formula 3]

$$R_{201}-O-R_{202} \quad (2-1)$$

wherein $R_{201}$ and $R_{202}$ each independently represent an alkyl group or a fluorine-substituted alkyl group, and at least one of $R_{201}$ and $R_{202}$ is a fluorine-substituted alkyl group.

In $R_{201}$ and $R_{202}$, the number of carbon atoms of the alkyl group or the fluorine-substituted alkyl group is each independently preferably 1 to 8, more preferably 1 to 6, further preferably 1 to 4, and particularly preferably 1 to 3.

In formula (2-1), the alkyl group or the fluorine-substituted alkyl group includes linear, branched, or cyclic ones. The alkyl group is preferably linear or branched. The fluorine-substituted alkyl group is preferably linear or branched.

$R_{201}$ and $R_{202}$ are each independently preferably a fluorine-substituted alkyl group having 1 to 6 carbon atoms, more preferably a fluorine-substituted alkyl group having 1 to 4 carbon atoms.

From the viewpoint of voltage resistance and compatibility with other electrolytes, the chain fluorine-containing ether compounds are preferably compounds represented by the following formula (I):

$$X^1-(CX^2X^3)_n-CH_2O-(CX^4X^5)_m-X^6 \quad (I)$$

wherein n is 1 to 8, m is 1 to 4, and $X^1$ to $X^6$ are each independently a fluorine atom or a hydrogen atom provided that at least one of $X^1$ to $X^3$ is a fluorine atom, and at least one of $X^4$ to $X^6$ is a fluorine atom.

In formula (I), when n is 2 or more, $X^2$ and $X^3$ may each be independent for each carbon atom to which they are bonded. When m is 2 or more, $X^4$ and $X^5$ may each be independent for each carbon atom to which they are bonded.

From the viewpoint of voltage resistance and compatibility with other electrolytes, the chain fluorine-containing ether compounds are preferably compounds represented by the following formula (II):

$$Y^1-(CY^2Y^3)_n-CH_2O-CY^4Y^5-CY^6Y^7-Y^8 \quad (II)$$

wherein n is 1 to 8, and $Y^1$ to $Y^8$ are each independently a fluorine atom or a hydrogen atom provided that at least one of $Y^1$ to $Y^3$ is a fluorine atom, and at least one of $Y^4$ to $Y^8$ is a fluorine atom.

In formula (II), when n is 2 or more, $Y^2$ and $Y^3$ may each be independent for each carbon atom to which they are bonded.

Examples of the chain fluorine-containing ether compounds include $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $H(CF_2)_2CH_2OCF_2CHFCF_3$, $CHF_2-CH_2-O-CF_2CFH-CF_3$, and $F(CF_2)_2CH_2OCF_2CFHCF_3$.

One chain fluorine-containing ether compound may be used alone, or two or more chain fluorine-containing ether compounds may be used in combination.

The cyclic fluorine-containing ether compounds are, for example, compounds having structures in which some or all of the hydrogen atoms of cyclic ether compounds such as tetrahydrofuran, 2-methyltetrahydrofuran, 3-methyltetrahydrofuran, tetrahydropyran, 2-methyltetrahydropyran, 3-methyltetrahydropyran, 4-methyltetrahydropyran, 1,3-dioxolane, 2-methyl-1,3-dioxolane, 4-methyl-1,3-dioxolane, 1,4-dioxane, 2-methyl-1,4-dioxane, 2-ethyl-1,4-dioxane, 2-propyl-1,4-dioxane, 2,3-dimethyl-1,4-dioxane, 1,3-dioxane, 2-methyl-1,3-dioxane, 4-methyl-1,3-dioxane, 5-methyl-1,3-dioxane, 2,4-dimethyl-1,3-dioxane, or 4-ethyl-1,3-dioxane are replaced by fluorine atoms. Among these, the cyclic fluorine-containing ether compounds are preferably compounds having structures in which some or all of the hydrogen atoms of tetrahydrofuran, tetrahydropyran, or 1,4-dioxane are replaced by fluorine atoms from the viewpoint of the cycle characteristics of the secondary battery.

From the viewpoint of the cycle characteristics of the secondary battery, preferred examples of the cyclic fluorine-containing ether compounds include compounds represented by the following formula (2-2):

[Formula 4]

(2-2)

wherein $R_{203}$ represents a fluorine-substituted alkylene group that may comprise one ether group disposed between carbon atoms.

In formula (2-2), the fluorine-substituted alkylene group also includes linear, branched, or cyclic ones. The fluorine-substituted alkylene group is preferably linear or branched.

In formula (2-2), when one ether group disposed between carbon atoms is included, the number of carbon atoms of the fluorine-substituted alkylene group is preferably 3 to 9, more preferably 3 to 7, and further preferably 3 to 5. When an ether group is not included, the number of carbon atoms of the fluorine-substituted alkylene group is preferably 4 to 10, more preferably 4 to 8, and further preferably 4 to 6.

Examples of the cyclic fluorine-containing ether compounds include fluorine-containing tetrahydrofuran compounds represented by the following formula (2-2-1):

[Formula 5]

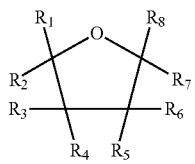

(2-2-1)

wherein $R_1$ to $R_8$ are each independently a hydrogen atom, a fluorine atom, an alkyl group, or a fluorine-substituted alkyl group, and at least one of $R_1$ to $R_8$ is a fluorine atom or a fluorine-substituted alkyl group.

Examples of the cyclic fluorine-containing ether compounds include fluorine-containing dioxolane compounds represented by the following formula (2-2-2):

[Formula 6]

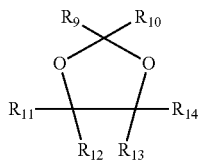

(2-2-2)

wherein $R_9$ to $R_{14}$ are each independently a hydrogen atom, a fluorine atom, an alkyl group, or a fluorine-substituted alkyl group, and at least one of $R_9$ to $R_{14}$ is a fluorine atom or a fluorine-substituted alkyl group.

Examples of the cyclic fluorine-containing ether compounds include fluorine-containing tetrahydropyran compounds represented by the following formula (2-2-3):

[Formula 7]

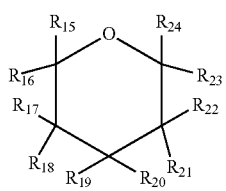

(2-2-3)

wherein $R_{15}$ to $R_{24}$ are each independently a hydrogen atom, a fluorine atom, an alkyl group, or a fluorine-substituted alkyl group, and at least one of $R_{15}$ to $R_{24}$ is a fluorine atom or a fluorine-substituted alkyl group.

Examples of the cyclic fluorine-containing ether compounds include fluorine-containing 1,4-dioxane compounds represented by the following formula (2-2-4):

[Formula 8]

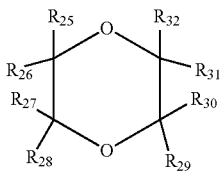

(2-2-4)

wherein $R_{25}$ to $R_{32}$ are each independently a hydrogen atom, a fluorine atom, an alkyl group, or a fluorine-substituted alkyl group, and at least one of $R_{25}$ to $R_{32}$ is a fluorine atom or a fluorine-substituted alkyl group.

Examples of the cyclic fluorine-containing ether compounds include fluorine-containing 1,3-dioxane compounds represented by the following formula (2-2-5):

[Formula 9]

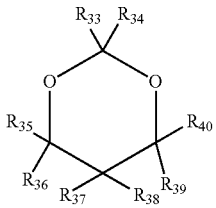

(2-2-5)

wherein $R_{33}$ to $R_{40}$ are each independently a hydrogen atom, a fluorine atom, an alkyl group, or a fluorine-substituted alkyl group, and at least one of $R_{33}$ to $R_{40}$ is a fluorine atom or a fluorine-substituted alkyl group.

In formulas (2-2-1) to (2-2-5), the number of carbon atoms of the alkyl group is preferably 1 to 6, more preferably 1 to 4, and further preferably 1 to 3. In addition, the alkyl group is linear or branched, preferably linear.

In formulas (2-2-1) to (2-2-5), the number of carbon atoms of the fluorine-substituted alkyl group is preferably 1 to 6, more preferably 1 to 4, and further preferably 1 to 3. In addition, the fluorine-substituted alkyl group is linear or branched, preferably linear.

One cyclic fluorine-containing ether compound may be used alone, or two or more cyclic fluorine-containing ether compounds may be used in combination.

[Halogen-Containing Ester Compound]

The halogen-containing ester compound is a compound having a structure in which some or all of the hydrogen atoms of an ester compound having an ester group (—COO—) are replaced by halogen atoms. Examples of the halogen-containing ester compound include chain halogen-containing ester compounds (for example, chain fluorine-containing ester compounds).

From the viewpoint of the cycle characteristics of the secondary battery, preferred examples of the chain fluorine-containing ester compounds include compounds represented by the following formula (3-1):

[Formula 10]

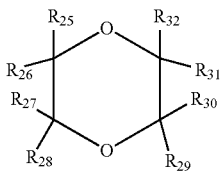

(3-1)

wherein $R_{301}$ and $R_{302}$ each independently represent an alkyl group or a fluorine-substituted alkyl group, and at least one of $R_{301}$ and $R_{302}$ is a fluorine-substituted alkyl group.

In $R_{301}$ and $R_{302}$, the number of carbon atoms of the alkyl group or the fluorine-substituted alkyl group is each independently preferably 1 to 8, more preferably 1 to 6, further preferably 1 to 4, and particularly preferably 1 to 3.

In formula (3-1), the alkyl group or the fluorine-substituted alkyl group includes linear, branched, or cyclic ones. The alkyl group is preferably linear or branched. The fluorine-substituted alkyl group is preferably linear or branched.

$R_{301}$ and $R_{302}$ are each independently preferably a fluorine-substituted alkyl group having 1 to 6 carbon atoms, more preferably a fluorine-substituted alkyl group having 1 to 4 carbon atoms.

The above chain fluorine-containing ester compounds are preferably compounds represented by the following (3-1-1):

$$F(CZ^1Z^2)_n COO(CZ^3Z^4)_m CH_3 \qquad (3\text{-}1\text{-}1)$$

wherein n is 1 to 4, m is 1 to 4, and $Z^1$ to $Z^4$ are each independently a fluorine atom or a hydrogen atom.

In formula (3-1-1), when n is 2 or more, $Z^1$ and $Z^2$ may each be independent for each carbon atom to which they are bonded. In addition, when m is 2 or more, $Z^3$ and $Z^4$ may each be independent for each carbon atom to which they are bonded.

Examples of the chain fluorine-containing ester compounds include $CF_3COOCH_3$, $CF_3COOC_2H_6$, $F(CF_2)_2COOCH_3$, $F(CF_2)_2COOC_2H_5$, $F(CF_2)_3COOCH_3$, $F(CF_2)_3COOC_2H_5$, $F(CF_2)_4COOCH_3$, $F(CF_2)_4COOC_2H_5$, $F(CF_2)_5COOCH_3$, $F(CF_2)_5COOC_2H_5$, $F(CF_2)_8COOCH_3$, $F(CF_2)_8COOC_2H_5$, $F(CF_2)_9COOCH_3$, $CF_3CH_2COOCH_3$, $CF_3CH_2COOCHF_2$, $CF_3CF_2CH_2COOCH_3$, $CF_3CF_2CH_2COOCHF_2$, $CF_3CF_2CH_2COO(CF_2)_2H$, $CF_3CF_2CH_2COO(CF_2)_2F$, $HCF_2CH_2COOCH_3$, $H(CF_2)_2COOCH_2CH_3$, $H(CF_2)_2COOCH_2CF_3$, $H(CF_2)_2CH_2COOCHF_2$, $H(CF_2)_2CH_2COO(CF_2)_2H$, $H(CF_2)_2CH_2COO(CF_2)_3H$, $H(CF_2)_3CH_2COO(CF_2)_2H$, $(CF_3)_2CHCOOCH_3$, $(CF_3)_2CHCF_2COOCH_3$, $CF_3CHFCF_2COOCH_3$, $CF_3CHFCF_2COOCH_2CH_3$, $CF_3CHFCF_2CH_2COOCHF_2$, $H(CF_2)_2CH_2COOCF_2CHFCF_3$, $CHF_2\text{—}CH_2\text{—}COO\text{—}CF_2CFH\text{—}CF_3$, and $F(CF_2)_2CH_2COOCF_2CFHCF_3$.

One chain fluorine-containing ester compound may be used alone, or two or more chain fluorine-containing ester compounds may be used in combination.

[2] Negative Electrode

A secondary battery in the present exemplary embodiment includes a negative electrode. The negative electrode includes a negative electrode active material. The negative electrode active material can be bound on a negative electrode current collector with a negative electrode binding agent. As the negative electrode, for example, a negative electrode current collector on which a negative electrode active material layer including a negative electrode active material and a negative electrode binding agent is formed can be used.

The negative electrode active material is not particularly limited. Examples thereof include lithium metal, metals (a) capable of being alloyed with lithium, metal oxides (b) capable of intercalating and releasing lithium ions, or carbon materials (c) capable of intercalating and releasing lithium ions. One negative electrode active material can be used alone, or two or more negative electrode active materials can be used in combination.

Examples of the metals (a) include Al, Si, Pb, Sn, In, Bi, Ag, Ba, Ca, Hg, Pd, Pt, Te, Zn, La, or alloys of two or more of these. Two or more of these metals or alloys may be mixed and used. These metals or alloys may include one or more nonmetal elements. Among these, silicon, tin, or alloys thereof are preferably used as the negative electrode active material. By using silicon or tin as the negative electrode active material, a lithium secondary battery having excellent weight energy density and volume energy density can be provided.

Examples of the metal oxides (b) include silicon oxide, aluminum oxide, tin oxide, indium oxide, zinc oxide, lithium oxide, or composites thereof. Among these, silicon oxide is preferably used as the negative electrode active material. In addition, the metal oxides (b) can contain one or two or more elements selected from among nitrogen, boron, and sulfur, for example, in the range of 0.1 to 5% by mass.

Examples of the carbon materials (c) include graphite, amorphous carbon, diamond-like carbon, carbon nanotubes, or composites thereof.

The negative electrode binding agent is not particularly limited. Examples thereof include polyvinylidene fluoride, vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, polyamideimides, and polyacrylic acid.

The negative electrode can be fabricated, for example, by forming a negative electrode active material layer including a negative electrode active material and a negative electrode binding agent on a negative electrode current collector. This negative electrode active material layer can be formed by a general slurry application method. Specifically, the negative electrode can be obtained by preparing a slurry including a negative electrode active material, a negative electrode binding agent, and a solvent, applying the slurry on a negative electrode current collector, drying it, and applying pressure as needed. Examples of the method for applying the negative electrode slurry include a doctor blade method, a die coater method, and a dip coating method. The negative electrode can also be obtained by previously forming a negative electrode active material layer and then forming a thin film of copper, nickel, or an alloy thereof as a current collector by a method such as vapor deposition or sputtering.

In addition, as the negative electrode binding agent, water-dispersible polymers are preferably used. The negative electrode binding agent can be used in an aqueous dispersion state. Examples of the water-dispersible polymers include styrene butadiene-based polymers, acrylic acid-based polymers, polytetrafluoroethylene, polyacrylates, and polyurethanes. These polymers can be dispersed in water and used. More specific examples of the water-dispersible polymers include natural rubbers (NR), styrene butadiene rubbers (SBR), acrylonitrile-butadiene copolymer rubbers (NBR), methyl methacrylate-butadiene copolymer rubbers (MBR), chloroprene rubbers (CR), acrylic rubbers (ABR), styrene butadiene-styrene copolymers (SBS), butyl rubbers (IIR), Thiokol, urethane rubbers, silicon rubbers, or fluoro rubbers. One of these can be used alone, or two or more of these can be used in combination.

In addition, when the water-dispersible polymer is used as the negative electrode binding agent, an aqueous thickening agent is preferably used. Examples of the aqueous thickening agent can include methyl cellulose, carboxymethyl cellulose (CMC), carboxymethyl cellulose sodium salt, carboxymethyl cellulose lithium salt, hydroxyethyl cellulose, polyethylene oxide, polyvinyl alcohol (PVA), polyvinylpyrrolidone, sodium polyacrylate, polyacrylic acid, polyethylene glycol, or polyethylene oxide. One of these can be used alone, or two or more of these can be used in combination.

When the water-dispersible polymer is used as the negative electrode binding agent, the negative electrode is fabricated in a state in which a large amount of water is included. In order to remove this water, a drying step is performed, but the water may not be sufficiently removed even by this drying step. Therefore, when the water-dispersible polymer is used as the negative electrode binding agent, a state in which a large amount of water is included in the negative electrode is brought about, which may influence the cycle characteristics of the secondary battery.

The production method according to the present exemplary embodiment can effectively remove water, and therefore can be effectively utilized particularly when the water-dispersible polymer is used.

The amount of the negative electrode binding agent is preferably 5 to 25 parts by mass based on 100 parts by mass of the negative electrode active material.

The content of the aqueous thickening agent is, for example, 0.1 to 5.0 parts by mass, preferably 0.5 to 3.0 parts by mass, based on 100 parts by mass of the negative electrode active material.

As the dispersion medium, water is preferably used, and in addition to water, a water-soluble solvent such as an alcohol-based solvent, an amine-based solvent, a carboxylic acid-based solvent, or a ketone-based solvent may be included as the dispersion medium.

The negative electrode can be fabricated, for example, as follows. First, a negative electrode active material, an aqueous thickening agent, a water-dispersible polymer, and water are kneaded to prepare a negative electrode slurry. Next, this aqueous slurry is applied to a negative electrode current collector and dried followed by pressing to fabricate a negative electrode.

The amount of water included in the negative electrode active material layer after the negative electrode is fabricated is preferably 50 ppm or more, and preferably 1000 ppm or less. In addition, the amount of water included in the negative electrode active material layer is more preferably 500 ppm or less. The amount of water included in the negative electrode active material layer can be measured, for example, by a coulometric titration method using a Karl Fischer measuring instrument.

As the negative electrode current collector, aluminum, nickel, stainless steel, chromium, copper, silver, and alloys thereof are preferred in terms of electrochemical stability. Examples of its shape include foil, a flat plate shape, and a mesh shape.

The negative electrode active material layer may include a conductive aid such as carbon from the viewpoint of improving conductivity.

The negative electrode slurry may include other components as needed. Examples of the other components include surfactants and defoaming materials. When the negative electrode slurry contains a surfactant, the dispersion stability of the negative electrode binding agent can be improved. In addition, when the negative electrode slurry contains a defoaming agent, foaming when a slurry containing a surfactant is applied can be suppressed.

[3] Positive Electrode

The secondary battery in the present exemplary embodiment includes a positive electrode. The positive electrode includes a positive electrode active material. The positive electrode active material can be bound on a positive electrode current collector with a positive electrode binding agent. For the positive electrode, a positive electrode current collector on which a positive electrode active material layer including a positive electrode active material and a positive electrode binding agent is formed can be used.

The positive electrode active material is not particularly limited. Examples thereof include lithium complex oxides and iron lithium phosphate. In addition, those in which at least parts of the transition metals of these lithium complex oxides are replaced by other elements may be used. In addition, lithium complex oxides with a plateau at a metal lithium counter electrode potential of 4.2 V or more can also be used. Examples of the lithium complex oxides include spinel type lithium manganese complex oxides, olivine type lithium-containing complex oxides, and inverse spinel type lithium-containing complex oxides.

Examples of the lithium complex oxides include lithium manganate having a layered structure or lithium manganate having a spinel structure such as $LiMnO_2$ or $Li_xMn_2O_4$ (0<x<2), or those in which part of the Mn of these lithium manganates is replaced by at least one element selected from the group consisting of Li, Mg, Al, Co, B, Ti, and Zn; lithium cobaltate such as $LiCoO_2$, or those in which part of the Co of lithium cobaltate is replaced by at least one element selected from the group consisting of Ni, Al, Mn, Mg, Zr, Ti, and Zn; lithium nickelate such as $LiNiO_2$, or those in which part of the Ni of lithium nickelate is replaced by at least one element selected from the group consisting of Co, Al, Mn, Mg, Zr, Ti, and Zn; lithium transition metal oxides in which particular transition metals do not exceed half, such as $LiNi_{1/3}Co_{1/3}Mn_{1/3}O_2$, or those in which parts of the transition metals of the lithium transition metal oxides are replaced by at least one element selected from the group consisting of Co, Al, Mn, Mg, and Zr; and these lithium transition metal oxides in which Li is more excessive than in stoichiometric compositions. Particularly, as the lithium complex oxides, $Li_\alpha Ni_\beta Co_\gamma Al_\delta O_2$ (1≤α≤1.2, β+γ+δ=1, β≥0.7, and γ≤0.2) or $Li_\alpha Ni_\beta Co_\gamma Mn_\delta O_2$ (1≤α≤1.2, β+γ+δ=1, β≤0.4, and γ≤0.4), or those in which parts of the transition metals of these complex oxides are replaced by at least one element selected from the group consisting of Al, Mg, and Zr are preferred. One of these lithium complex oxides may be used alone, or two or more of these lithium complex oxides may be used in combination.

Preferred examples of the lithium complex oxides include compounds represented by the following formula:

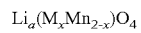

$$Li_a(M_xMn_{2-x})O_4$$

wherein x satisfies 0<x<2, a satisfies 0<a<1.2, and M is at least one element selected from the group consisting of Ni, Co, Fe, Cr, and Cu.

In addition, as the positive electrode active material, active materials that operate at potentials of 4.5 V or more versus lithium (hereinafter also referred to as 5 V class active materials) can be used from the viewpoint that high voltage is obtained. When a 5 V class active material is used, gas generation due to the decomposition of the electrolytic solution, and the like occurs easily, but by using the electrolytic solution containing the compounds in the present exemplary embodiment, gas generation can be suppressed.

As the 5 V class active materials, for example, lithium manganese complex oxides represented by the following formula (A) can be used.

$$Li_a(M_xMn_{2-x-y}Y_y)(O_{4-w}Z_w) \qquad (A)$$

wherein 0.4≤x≤1.2, 0≤y, x+y<2, 0≤a≤1.2, and 0≤w≤1; M is at least one element selected from the group consisting of Co, Ni, Fe, Cr, and Cu; Y is at least one element selected from the group consisting of Li, B, Na, Mg, Al, Ti, Si, K, and Ca; and Z is at least one selected from the group consisting of F and Cl.

In addition, as the 5 V class active materials, among such metal complex oxides, spinel type compounds represented by the following formula (B) are preferably used from the viewpoint of obtaining sufficient capacity and achieving longer life.

$$LiNi_xMn_{2-x-y}A_yO_4 \quad (B)$$

wherein $0.4<x<0.6$, $0 \leq y<0.3$, and A is at least one selected from the group consisting of Li, B, Na, Mg, Al, Ti, and Si.

In formula (B), $0 \leq y<0.2$ is more preferred.

In addition, examples of the active materials that operate at potentials of 4.5 V or more versus lithium include olivine type positive electrode active materials. Examples of the olivine type 5 V active materials include $LiCoPO_4$ or $LiNiPO_4$.

In addition, examples of the active materials that operate at potentials of 4.5 V or more versus lithium include Si complex oxides. Examples of such Si complex oxides include compounds represented by the following formula (C):

$$Li_2MSiO_4 \quad (C)$$

wherein M is at least one selected from the group consisting of Mn, Fe, and Co.

In addition, the active materials that operate at potentials of 4.5 V or more versus lithium may have layered structures. Examples of the 5 V class active materials having layered structures include compounds represented by the following formula (D):

$$Li(M1_xM2_yMn_{2-x-y})O_2 \quad (D)$$

wherein M1 is at least one selected from the group consisting of Ni, Co, and Fe; M2 is at least one selected from the group consisting of Li, Mg, and Al; and $0.1<x<0.5$ and $0.05<y<0.3$.

As the 5 V class active materials, lithium metal complex oxides represented by the following (E) to (G) can be used.

$$LiMPO_4 \quad (E)$$

wherein M is at least one selected from the group consisting of Co and Ni.

$$Li(M_yMn_z)O_2 \quad (F)$$

wherein $0.1 \leq y \leq 0.5$, $0.33 \leq z \leq 0.7$, and M is at least one selected from the group consisting of Li, Co, and Ni.

$$Li(Li_xM_yMn_z)O_2 \quad (G)$$

wherein $0.1 \leq x<0.3$, $0.1 \leq y \leq 0.4$, $0.33 \leq z \leq 0.7$, and M is at least one selected from the group consisting of Li, Co, and Ni.

The positive electrode can be fabricated, for example, as follows. First, a positive electrode slurry including a positive electrode active material, a positive electrode binding agent, and a solvent (and further a conductive auxiliary material as needed) is prepared. This positive electrode slurry is applied on a positive electrode current collector and dried, and pressure is applied as needed, to form a positive electrode active material layer on the positive electrode current collector to fabricate a positive electrode.

The positive electrode binding agent is not particularly limited, and, for example, the same agents as the negative electrode binding agent can be used. From the viewpoint of versatility and low cost, polyvinylidene fluoride is preferred. The content of the positive electrode binding agent is preferably in the range of 1 to 25 parts by mass, more preferably in the range of 2 to 20 parts by mass, and further preferably in the range of 2 to 10 parts by mass based on 100 parts by mass of the positive electrode active material from the viewpoint of binding force and energy density in a trade-off relationship. Examples of binding agents other than polyvinylidene fluoride (PVdF) include vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, or polyamideimides. As the solvent, for example, N-methyl-2-pyrrolidone (NMP) can be used.

As the positive electrode binding agent, water-dispersible polymers are preferably used. In addition, when the water-dispersible polymer is used as the positive electrode binding agent, an aqueous thickening agent is preferably used. As described above, the production method according to the present exemplary embodiment can effectively remove water, and therefore can be effectively utilized particularly when the water-dispersible polymer is used.

The positive electrode current collector is not particularly limited. Examples thereof include aluminum, titanium, tantalum, nickel, silver, or alloys thereof. Examples of the shape of the positive electrode current collector include foil, a flat plate shape, and a mesh shape. As the positive electrode current collector, aluminum foil can be preferably used.

In the fabrication of the positive electrode, a conductive auxiliary material may be added for the purpose of decreasing impedance. Examples of the conductive auxiliary material include carbonaceous fine particles such as graphite, carbon black, and acetylene black.

[4] Separator

The separator is not particularly limited, and, for example, porous films and nonwoven fabrics of polypropylene, polyethylene, and the like can be used. In addition, as the separator, ceramic-coated separators in which coatings including ceramics are formed on polymer base materials used as separators can also be used. In addition, as the separator, stacks of the above separator materials can also be used.

[5] Outer Package

The outer package is not particularly limited, and, for example, laminate films can be used. For example, in the case of a stacked laminate type secondary battery, laminate films of aluminum, silica-coated polypropylene, polyethylene, and the like can be used.

In the case of a secondary battery using a laminate film as a package, the strain of the electrode assembly (stack) due to gas generation is large compared with a secondary battery using a metal case as a package. This is because the laminate film is easily deformed by the internal pressure of the secondary battery compared with the metal can. Further, when the secondary battery using a laminate film as a package is sealed, usually, the battery internal pressure is set lower than atmospheric pressure, and therefore there is no extra space inside, and when a gas is generated, it easily immediately leads to the volume change of the battery and the deformation of the electrode assembly. In the production method according to the present exemplary embodiment, water can be effectively removed even when the halogen-containing compound is used, and therefore cycle characteristics such as volume increase can be improved. Therefore, the production method according to the present exemplary embodiment is particularly effective for the production of a stacked laminate type secondary battery.

[6] Secondary Battery

The configuration of the secondary battery according to the present exemplary embodiment is not particularly limited. Examples of the configuration can include a configuration in which an electrode assembly in which a positive electrode and a negative electrode are disposed opposite to each other and an electrolytic solution are included in a package.

A stacked laminate type lithium ion secondary battery will be described below as an example. FIG. 1 is a schematic configuration diagram showing one example of the basic configuration of the secondary battery according to the present exemplary embodiment. In the positive electrode, a positive electrode active material layer 1 is formed on a positive electrode current collector 3. In the negative electrode, a negative electrode active material layer 2 is formed on a negative electrode current collector 4. These positive electrode and negative electrode are disposed opposite to each other via a separator 5. The separator 5 is stacked and disposed generally parallel to the positive electrode active material layer 1 and the negative electrode active material layer 2. The electrode pair of the positive electrode and the negative electrode and an electrolytic solution are included in packages 6 and 7. A positive electrode tab 9 connected to the positive electrode, and a negative electrode tab 8 connected to the negative electrode are provided so as to be exposed from the packages. The shape of the secondary battery according to the present exemplary embodiment is not particularly limited. Examples thereof include a laminate packaging type, a cylindrical type, a prismatic type, a coin type, and a button type.

[Production Steps]

An example of production steps in the present exemplary embodiment will be described below with reference to the drawings.

The present exemplary embodiment will be described below with reference to the drawings. Like numerals are given to configurations having like functions in the accompanying drawings, and their description may be omitted.

Figure 2:
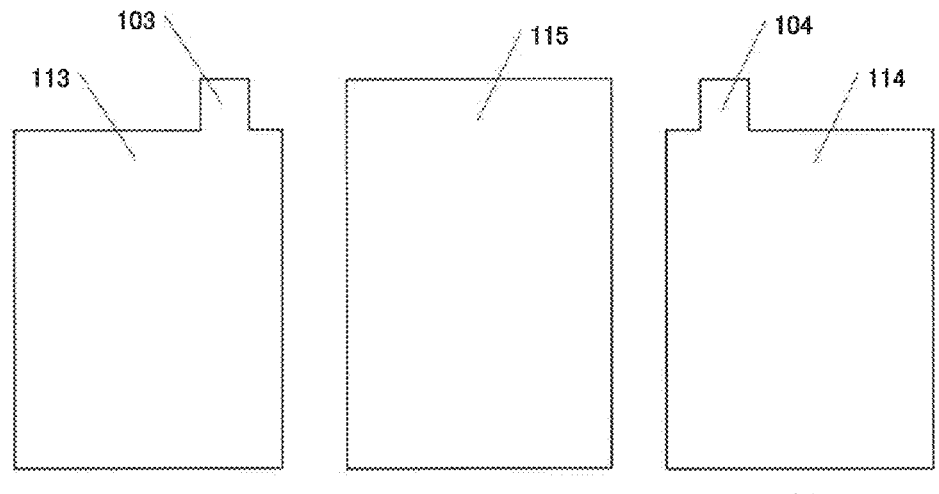
FIG. 2 shows schematic plan views for describing a production method according to the present exemplary embodiment.
Figure 2:
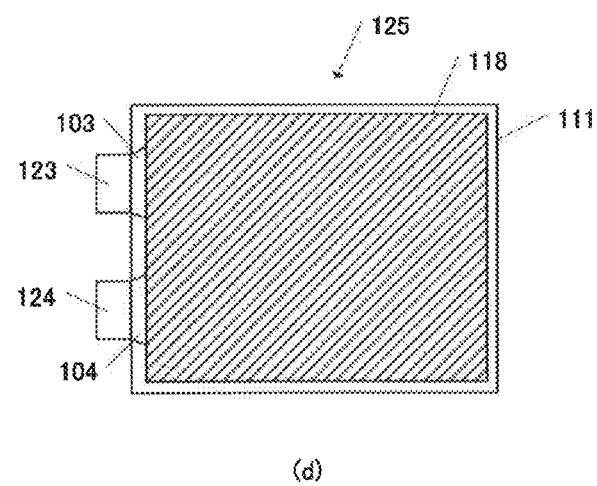

FIG. 2 shows schematic configuration diagrams for describing an example of the configuration of a stacked laminate type secondary battery. FIG. 2 (a) is a schematic plan view showing a positive electrode, FIG. 2 (b) is a schematic plan view showing a separator, and FIG. 2 (c) is a schematic plan view showing a negative electrode. FIG. 2 (d) shows a stacked laminate type secondary battery and is a schematic plan view.

A positive electrode terminal 103 is provided in a positive electrode 113, and a negative electrode terminal 104 is provided in a negative electrode 114. As a sheet-like separator 115, for example, a microporous film made of a synthetic resin such as polyethylene or polypropylene is used.

The above-described positive electrodes 113 and negative electrodes 114 are alternately stacked via the separators 115, and thus a stack 118 as an electrode assembly is formed. In addition, the positive electrodes 113 and the negative electrodes 114 are stacked so that the positive electrode terminals 103 and the negative electrode terminals 104 face in the same direction. In other words, the positive electrode terminals 103 and the negative electrode terminals 104 are positioned on the same side of the stack 118. However, in order to prevent the positive electrode terminals 103 and the negative electrode terminals 104 from coming into contact with each other and short-circuiting, the positive electrode terminals 103 and the negative electrode terminals 104 are preferably disposed so as not to overlap.

Each positive electrode terminal 103 is connected to a positive electrode lead 123, and each negative electrode terminal 104 is connected to a negative electrode lead 124.

The stack 118 is disposed, together with an electrolytic solution, in a package 111 including, for example, a flexible laminate film in which both surfaces of metal foil such as aluminum foil are covered with resin layers. The positive electrode lead 123 and the negative electrode lead 124 are led out of the package 111. The portions of the laminate film other than a first opening for injecting a first solution are heat-sealed. The position of the first opening is not particularly limited and can be provided, for example, on the upper end side in FIG. 2 (d).

Next, the above first solution is injected into the package from the first opening. After the first solution is injected, the pressure of the inside is reduced as needed, and the first opening is temporarily sealed. The temporary sealing can be performed, for example, by heat sealing.

Next, the stack 118 as an electrode assembly is charged.

By this charge, water present in the package is decomposed. A halogen-containing compound is not included in the first solution, and therefore the water can be decomposed without the inhibition of the decomposition of water.

For charge conditions, the charge is preferably performed by CCCV charge. The CCCV charge is a method of performing charge at a constant current to a predetermined voltage and, after reaching the predetermined voltage, performing charge for a constant time while keeping the voltage. The current to the predetermined voltage is preferably in the range of 0.05 C to 2 C, more preferably in the range of 0.2 C to 0.5 C. When the current is 0.05 C or more, the charge time can be shortened. When the current is 2 C or less, the reaction in the electrodes occurs uniformly easily, and the decomposition of water can be more efficiently performed.

The charge is preferably performed until the voltage reaches 2.3 V or more, more preferably 2.8 V or more, further preferably 3.2 V or more, and particularly preferably 3.6 V or more. By performing charge until the voltage reaches 2.3 V or more, water present in the package can be effectively decomposed.

The upper limit of the voltage during the charge is preferably 4.3 V or less, more preferably 4.1 V or less. By setting the upper limit of the voltage at 4.3 V or less, the deterioration of the positive electrodes and the degree of decomposition of the electrolytic solution can be reduced.

Next, the package is opened, and the gas generated by the charge is emitted from the package. The method for emitting the gas is not particularly limited, and a second opening should be provided in the package to emit the gas from the second opening. In addition, pressure-reducing means may be used as needed. In addition, the gas may be sucked out using a needle or the like.

More specifically, for example, by disposing in a chamber the package 111 in which the second opening is provided and reducing the pressure in the chamber, the gas can be emitted from the package. The pressure in the chamber can be determined considering the shape of the second opening, the size of the package 111, the size of the stack 118, or the like.

Next, the step of discharging (discharging step) may be provided as needed. By providing the discharging step before injecting a second solution, the safety of operation can be improved. The discharge is preferably performed until the voltage reaches 2.8 V or less, more preferably 2.5 V or less.

Next, the above second solution is injected into the package.

By adding the second solution to the first solution, an electrolytic solution containing a halogen-containing compound can be formed.

After the second solution is added to the package, the internal pressure is reduced as needed, and the package is sealed.

The secondary battery can be produced by the above steps.

EXAMPLES

The exemplary embodiments will be specifically described below by Examples, but the present invention is not limited to these.

Example A1

<Negative Electrode>

As a negative electrode active material, graphite was used. This negative electrode active material, polyvinylidene fluoride as a negative electrode binding agent, and acetylene black as a conductive auxiliary material were measured at a mass ratio of 75:20:5. Then, these were mixed with N-methylpyrrolidone to prepare a negative electrode slurry. The negative electrode slurry was applied to copper foil having a thickness of 10 μm followed by drying and further heat treatment at 120° C. under a nitrogen atmosphere to fabricate a negative electrode.

<Positive Electrode>

As a positive electrode active material, a mixture of $LiMn_2O_4$ and $LiNiO_2$ at a mass ratio of 7:3 was used. This positive electrode active material, carbon black as a conductive auxiliary material, and polyvinylidene fluoride as a positive electrode binding agent were measured at a mass ratio of 90:5:5. Then, these were mixed with N-methylpyrrolidone to prepare a positive electrode slurry. The positive electrode slurry was applied to aluminum foil having a thickness of 20 μm followed by drying and further pressing to fabricate a positive electrode.

<Electrode Assembly>

The above positive electrode and negative electrode were cut to 3 cm×3 cm. The obtained three positive electrode layers and four negative electrode layers were alternately laid on top of each other while polypropylene porous films as separators were sandwiched. Ends of the positive electrode current collector not covered with the positive electrode active material and the negative electrode current collector not covered with the negative electrode active material were each welded. Further, a positive electrode terminal made of aluminum and a negative electrode terminal made of nickel were welded to the welded parts respectively to obtain an electrode assembly including a planar stacked structure.

<First Solution>

As a nonaqueous solvent, a mixed solvent of EC and DEC (volume ratio: EC/DEC=30/70) was used. As a supporting salt, $LiPF_6$ was used. $LiPF_6$ was added to the mixed solvent so that the concentration of $LiPF_6$ in a first solution was 1 M, thereby preparing the first solution.

<Second Solution>

As a second solution, a solution containing a halogen-containing compound, a supporting salt, and a nonaqueous solvent was used.

As the halogen-containing compound, 4-fluoro-1,3-dioxolan-2-one (FC1), a halogen-containing carbonate compound, was used. As the nonaqueous solvent, a mixed solvent of EC and DEC (volume ratio: EC/DEC=30/70) was used. As the supporting salt, $LiPF_6$ was used. FC1 and $LiPF_6$ were added to the mixed solvent so that the content of FC1 in a second solution was 6.0% by mass and the concentration of $LiPF_6$ in the second solution was 1 M, thereby preparing the second solution.

<Production of Secondary Battery>

The electrode assembly was housed in an aluminum laminate film as an outer package, and 4.0 mL of the first solution was injected into the package. Then, while the pressure was reduced to 0.1 atmospheres, the package was temporarily sealed to fabricate a battery precursor.

Next, the battery precursor was charged. In the charge, the battery precursor was charged at 1 C to 3.6 V, and then subjected to constant voltage charge for 1.5 hours in total. Then, the battery precursor was subjected to constant current discharge at 1 C to 2.5 V.

Next, the package was opened, and the gas generated in the charging step was emitted. Next, 1.0 mL of the second solution was injected into the package. Then, while the pressure was reduced to 0.1 atmospheres, the package was sealed to fabricate a secondary battery.

<Evaluation>

A test was performed in which the fabricated secondary battery was repeatedly charged and discharged in the voltage range of 2.5 V to 4.1 V in a thermostat kept at 55° C. The volume increase rate (%) and the capacity retention rate (%) were evaluated. In the charge, the secondary battery was charged at 1 C to 4.1 V, and then subjected to constant voltage charge for 2.5 hours in total, and in the discharge, the secondary battery was subjected to constant current discharge at 1 C to 2.5 V.

The result is shown in Table 1.

The "volume increase rate (%)" is calculated by the following:

(volume after 200 cycles)/(volume before cycles)× 100 (unit: %).

The "capacity retention rate (%)" is calculated by the following:

(discharge capacity after 200 cycles)/(discharge capacity after 5 cycles)×100 (unit: %).

Example A2

A secondary battery was fabricated and evaluated as in Example A1 except that the content of FC1 in the second solution was 10.0% by mass. The results are shown in Table 1.

Example A3

A secondary battery was fabricated and evaluated as in Example A1 except that the content of FC1 in the second solution was 20.0% by mass. The results are shown in Table 1.

Example A4

A secondary battery was fabricated and evaluated as in Example A2 except that the amount of the first solution injected was 4.5 mL, and the amount of the second solution injected was 0.5 mL.

Example A5

A secondary battery was fabricated and evaluated as in Example A2 except that 4,4-difluoro-1,3-dioxolan-2-one (FC2) was used instead of FC1. The results are shown in Table 1.

Example A6

A secondary battery was fabricated and evaluated as in Example A2 except that trifluoropropylene carbonate (FC3) was used instead of FC1. The results are shown in Table 1.

Example A7

A secondary battery was fabricated and evaluated as in Example A2 except that bis(fluoroethyl) carbonate (FC4) was used instead of FC1. The results are shown in Table 1.

Example A8

A secondary battery was fabricated and evaluated as in Example A2 except that bis(trifluoromethyl) carbonate (FC5) was used instead of FC1. The results are shown in Table 1.

Example A9

A secondary battery was fabricated and evaluated as in Example A2 except that 4-fluoro-1,3-dioxol-2-one (FC6) was used instead of FC1. The results are shown in Table 1.

Comparative Example A1

As a comparison, a secondary battery was fabricated by including a halogen-containing compound in a first solution and not including a halogen-containing compound in a second solution. The details of the present Comparative Example will be described below.

As the first solution, a solution containing a halogen-containing compound, a supporting salt, and a nonaqueous solvent was used. More specifically, a mixed solvent of EC and DEC (volume ratio: EC/DEC=30/70) was used as the nonaqueous solvent, $LiPF_6$ was used as the supporting salt, and FC1 was used as the halogen-containing compound. FC1 and $LiPF_6$ were added to the mixed solvent so that the content of FC1 in the first solution was 1.5% by mass and the concentration of $LiPF_6$ in the first solution was 1 M, thereby preparing the first solution.

As the second solution, a solution containing a supporting salt and a nonaqueous solvent was used. More specifically, a mixed solvent of EC and DEC (volume ratio: EC/DEC=30/70) was used as the nonaqueous solvent, and $LiPF_6$ was used as the supporting salt. $LiPF_6$ was added to the mixed solvent so that the concentration of $LiPF_6$ in the second solution was 1 M, thereby preparing the second solution.

The above electrode assembly was housed in an aluminum laminate film as an outer package, and 4.0 mL of the first solution of the present Comparative Example was injected into the package. Then, while the pressure was reduced to 0.1 atmospheres, the package was temporarily sealed to fabricate a battery precursor.

Next, the battery precursor was charged. In the charge, the battery precursor was charged at 1 C to 3.6 V, and then subjected to constant voltage charge for 1.5 hours in total. Then, the battery precursor was subjected to constant current discharge at 1 C to 2.5 V.

Next, the package was opened, and the gas generated in the charging step was emitted. Next, 1.0 mL of the second solution of the present Comparative Example was injected into the package. Then, while the pressure was reduced to 0.1 atmospheres, the package was sealed to fabricate a secondary battery.

For the obtained secondary battery, the volume increase rate (%) and the capacity retention rate (%) were measured by the methods described in Example A1. The results are shown in Table 1.

Comparative Example A2

A secondary battery was fabricated and evaluated as in Comparative Example A1 except that the content of FC1 in the first solution was 2.5% by mass. The results are shown in Table 1.

Comparative Example A3

As a comparison, a secondary battery was fabricated by a general method. The details of the present Comparative Example will be described below.

As an electrolytic solution, a solution containing a halogen-containing compound, a supporting salt, and a nonaqueous solvent was used. FC1 was used as the halogen-containing compound, a mixed solvent of EC and DEC (volume ratio: EC/DEC=30/70) was used as the nonaqueous solvent, and $LiPF_6$ was used as the supporting salt. FC1 and $LiPF_6$ were added to the mixed solvent so that the content of FC1 in the electrolytic solution was 1.2% by mass and the concentration of $LiPF_6$ in the electrolytic solution was 1 M, thereby preparing the electrolytic solution.

The above electrode assembly was housed in an aluminum laminate film as an outer package, and 5.0 mL of the electrolytic solution was injected into the package. Then, while the pressure was reduced to 0.1 atmospheres, the package was sealed to fabricate a secondary battery.

For the obtained secondary battery, the volume increase rate (%) and the capacity retention rate (%) were measured by the methods described in Example A1. The results are shown in Table 1.

Comparative Example A4

A secondary battery was fabricated and evaluated as in Comparative Example A3 except that the content of FC1 in the electrolytic solution was 2.0% by mass. The results are shown in Table 1.

Comparative Example A5

A secondary battery was fabricated and evaluated as in Comparative Example A2 except that FC4 was used instead of FC1. The results are shown in Table 1.

Comparative Example A6

A secondary battery was fabricated and evaluated as in Comparative Example A4 except that FC4 was used instead of FC1. The results are shown in Table 1.

TABLE 1

| | First solution | | | Second solution | | | Electrolytic solution | | | Volume increase rate (%) | Capacity retention rate (%) |
|---|---|---|---|---|---|---|---|---|---|---|---|
| | Halogen-containing compound | Content (% by mass) | Amount injected (mL) | Halogen-containing compound | Content (% by mass) | Amount injected (mL) | Halogen-containing compound | Content (% by mass) | Total amount (mL) | | |
| Example A1 | — | — | 4.0 | FC1 | 6.0 | 1.0 | FC1 | 1.2 | 5.0 | 99 | 92.0 |
| Example A2 | — | — | 4.0 | FC1 | 10.0 | 1.0 | FC1 | 2.0 | 5.0 | 100 | 92.9 |
| Example A3 | — | — | 4.0 | FC1 | 20.0 | 1.0 | FC1 | 4.0 | 5.0 | 102 | 94.1 |
| Example A4 | — | — | 4.5 | FC1 | 10.0 | 0.5 | FC1 | 1.0 | 5.0 | 99 | 91.0 |
| Example A5 | — | — | 4.0 | FC2 | 10.0 | 1.0 | FC2 | 2.0 | 5.0 | 100 | 91.5 |
| Example A6 | — | — | 4.0 | FC3 | 10.0 | 1.0 | FC3 | 2.0 | 5.0 | 100 | 92.0 |
| Example A7 | — | — | 4.0 | FC4 | 10.0 | 1.0 | FC4 | 2.0 | 5.0 | 100 | 90.7 |
| Example A8 | — | — | 4.0 | FC5 | 10.0 | 1.0 | FC5 | 2.0 | 5.0 | 100 | 90.3 |
| Example A9 | — | — | 4.0 | FC6 | 10.0 | 1.0 | FC6 | 2.0 | 5.0 | 100 | 90.6 |
| Comparative Example A1 | FC1 | 1.5 | 4.0 | — | — | 1.0 | FC1 | 1.2 | 5.0 | 106 | 83.2 |
| Comparative Example A2 | FC1 | 2.5 | 4.0 | — | — | 1.0 | FC1 | 2.0 | 5.0 | 109 | 85.7 |
| Comparative Example A3 | — | — | — | — | — | — | FC1 | 1.2 | 5.0 | 105 | 84.9 |
| Comparative Example A4 | — | — | — | — | — | — | FC1 | 2.0 | 5.0 | 107 | 83.2 |
| Comparative Example A5 | FC4 | 2.5 | 4.0 | — | — | 1.0 | FC4 | 2.0 | 5.0 | 109 | 84.5 |
| Comparative Example A6 | — | — | — | — | — | — | FC4 | 2.0 | 5.0 | 107 | 84.2 |

In the Examples, water was decomposed in initial charge, and for the fabricated secondary battery, a good result was obtained for the volume increase rate.

In the Comparative Examples, the secondary battery was fabricated in a state in which water remained in the package (particularly in the electrodes), and therefore the value of the volume increase rate was high.

It is considered that in Comparative Examples A1, A2, and A5, the halogen-containing compound was included in the first solution, and therefore the wettability between the first solution and the electrodes (particularly the negative electrodes) decreased, and the first solution did not easily penetrate the electrodes, and water in the electrodes could not be sufficiently decomposed by charge. Therefore, it is thought that the water remained in the battery, and this remaining water decomposed during the cycle test to generate a gas, and thus the volume increase was large. In addition, it is thought that the gas generated during the cycle test accumulated between the electrodes to increase the distance between the electrodes, and thus the cell resistance (the resistance of the electrode assembly) increased, and the capacity retention rate decreased.

Example B1

A secondary battery was fabricated and evaluated as in Example A1 except that 1,1,2,2-tetrafluoroethyl-2,2,3,3-tetrafluoropropyl ether (FE1) as a fluorine-containing ether compound was used instead of FC1. The results are shown in Table 2.

Example B2

A secondary battery was fabricated and evaluated as in Example A2 except that FE1 was used instead of FC1. The results are shown in Table 2.

Example B3

A secondary battery was fabricated and evaluated as in Example B2 except that 2,2,3,3,3-pentafluoropropyl-1,1,2,2-tetrafluoroethyl ether (FE2) was used instead of FE1. The results are shown in Table 2.

Example B4

A secondary battery was fabricated and evaluated as in Example B2 except that 1,1,3-trifluoropropyl-2-fluoropropyl ether (FE3) was used instead of FE1. The results are shown in Table 2.

Example B5

A secondary battery was fabricated and evaluated as in Example B2 except that hexafluorooxetane (FE4) was used instead of FE1. The results are shown in Table 2.

Example B6

A secondary battery was fabricated and evaluated as in Example B2 except that octafluorotetrahydrofuran (FE5) was used instead of FE1. The results are shown in Table 2.

Example B7

A secondary battery was fabricated and evaluated as in Example B2 except that 2-fluorotetrahydrofuran (FE6) was used instead of FE1. The results are shown in Table 2.

Comparative Example B1

A secondary battery was fabricated and evaluated as in Comparative Example A2 except that FE1 was used instead of FC1. The results are shown in Table 2.

Comparative Example B2

A secondary battery was fabricated and evaluated as in Comparative Example A4 except that FE1 was used instead of FC1. The results are shown in Table 2.

Comparative Example B3

A secondary battery was fabricated and evaluated as in Comparative Example A2 except that FE4 was used instead of FC1. The results are shown in Table 2.

Comparative Example B4

A secondary battery was fabricated and evaluated as in Comparative Example A4 except that FE4 was used instead of FC1. The results are shown in Table 2.

Example C5

A secondary battery was fabricated and evaluated as in Example C2 except that $F(CF_2)_2COOCH_2CF_3$ (FES4) was used instead of FES1. The results are shown in Table 3.

Example C6

A secondary battery was fabricated and evaluated as in Example C2 except that $F(CF_2)_2COOC_2H_5$ (FES5) was used instead of FES1. The results are shown in Table 3.

Example C7

A secondary battery was fabricated and evaluated as in Example C2 except that $F(CF_2)_2COOCH_3$ (FES6) was used instead of FES1. The results are shown in Table 3.

TABLE 2

| | First solution | | | Second solution | | | Electrolytic solution | | | Volume increase rate (%) | Capacity retention rate (%) |
|---|---|---|---|---|---|---|---|---|---|---|---|
| | Halogen-containing compound | Content (% by mass) | Amount injected (mL) | Halogen-containing compound | Content (% by mass) | Amount injected (mL) | Halogen-containing compound | Content (% by mass) | Total amount (mL) | | |
| Example B1 | — | — | 4.0 | FE1 | 6.0 | 1.0 | FE1 | 1.2 | 5.0 | 99 | 91.0 |
| Example B2 | — | — | 4.0 | FE1 | 10.0 | 1.0 | FE1 | 2.0 | 5.0 | 100 | 91.9 |
| Example B3 | — | — | 4.0 | FE2 | 10.0 | 1.0 | FE2 | 2.0 | 5.0 | 100 | 93.5 |
| Example B4 | — | — | 4.0 | FE3 | 10.0 | 1.0 | FE3 | 2.0 | 5.0 | 99 | 90.0 |
| Example B5 | — | — | 4.0 | FE4 | 10.0 | 1.0 | FE4 | 2.0 | 5.0 | 99 | 90.5 |
| Example B6 | — | — | 4.0 | FE5 | 10.0 | 1.0 | FE5 | 2.0 | 5.0 | 100 | 91.0 |
| Example B7 | — | — | 4.0 | FE6 | 10.0 | 1.0 | FE6 | 2.0 | 5.0 | 101 | 89.7 |
| Comparative Example B1 | FE1 | 2.5 | 4.0 | — | — | 1.0 | FE1 | 2.0 | 5.0 | 106 | 83.2 |
| Comparative Example B2 | — | — | — | — | — | — | FE1 | 2.0 | 5.0 | 109 | 85.7 |
| Comparative Example B3 | FE4 | 2.5 | 4.0 | — | — | 1.0 | FE4 | 2.0 | 5.0 | 107 | 84.9 |
| Comparative Example B4 | — | — | — | — | — | — | FE4 | 2.0 | 5.0 | 108 | 83.2 |

Example C1

A secondary battery was fabricated and evaluated as in Example A1 except that $CF_3COOCH_3$ (FES1) as a fluorine-containing ester compound was used instead of FC1. The results are shown in Table 3.

Example C2

A secondary battery was fabricated and evaluated as in Example A2 except that FES1 was used instead of FC1. The results are shown in Table 3.

Example C3

A secondary battery was fabricated and evaluated as in Example C2 except that $CF_3COOC_2H_6$ (FES2) was used instead of FES1. The results are shown in Table 3.

Example C4

A secondary battery was fabricated and evaluated as in Example C2 except that $CF_3COOCH_2CF_3$ (FES3) was used instead of FES1. The results are shown in Table 3.

Comparative Example C1

A secondary battery was fabricated and evaluated as in Comparative Example A2 except that FES1 was used instead of FC1. The results are shown in Table 3.

Comparative Example C2

A secondary battery was fabricated and evaluated as in Comparative Example A4 except that FES1 was used instead of FC1. The results are shown in Table 3.

Comparative Example C3

A secondary battery was fabricated and evaluated as in Comparative Example A2 except that FES4 was used instead of FC1. The results are shown in Table 3.

Comparative Example C4

A secondary battery was fabricated and evaluated as in Comparative Example A4 except that FES4 was used instead of FC1. The results are shown in Table 3.

TABLE 3

| | First solution | | | Second solution | | | Electrolytic solution | | | Volume increase rate (%) | Capacity retention rate (%) |
|---|---|---|---|---|---|---|---|---|---|---|---|
| | Halogen-containing compound | Content (% by mass) | Amount injected (mL) | Halogen-containing compound | Content (% by mass) | Amount injected (mL) | Halogen-containing compound | Content (% by mass) | Total amount (mL) | | |
| Example C1 | — | — | 4.0 | FES1 | 6.0 | 1.0 | FES1 | 1.2 | 5.0 | 101 | 89.1 |
| Example C2 | — | — | 4.0 | FES1 | 10.0 | 1.0 | FES1 | 2.0 | 5.0 | 102 | 89.9 |
| Example C3 | — | — | 4.0 | FES2 | 10.0 | 1.0 | FES2 | 2.0 | 5.0 | 102 | 90.5 |
| Example C4 | — | — | 4.0 | FES3 | 10.0 | 1.0 | FES3 | 2.0 | 5.0 | 102 | 88.2 |
| Example C5 | — | — | 4.0 | FES4 | 10.0 | 1.0 | FES4 | 2.0 | 5.0 | 102 | 91.7 |
| Example C6 | — | — | 4.0 | FES5 | 10.0 | 1.0 | FES5 | 2.0 | 5.0 | 102 | 88.4 |
| Example C7 | — | — | 4.0 | FES6 | 10.0 | 1.0 | FES6 | 2.0 | 5.0 | 102 | 87.7 |
| Comparative Example C1 | FES1 | 2.5 | 4.0 | — | — | 1.0 | FES1 | 2.0 | 5.0 | 110 | 79.2 |
| Comparative Example C2 | — | — | — | — | — | — | FES1 | 2.0 | 5.0 | 108 | 81.4 |
| Comparative Example C3 | FES4 | 2.5 | 4.0 | — | — | 1.0 | FES4 | 2.0 | 5.0 | 111 | 77.9 |
| Comparative Example C4 | — | — | — | — | — | — | FES4 | 2.0 | 5.0 | 108 | 83.1 |

Example D1

A secondary battery was fabricated and evaluated as in Example A1 except that the following negative electrode (using a water-dispersible polymer and an aqueous thickening agent) was used instead of the negative electrode described in Example A1. The results are shown in Table 4.

As a negative electrode active material, graphite was used. This negative electrode active material, styrene-butadiene copolymerized rubber (SBR) as a negative electrode binding agent, carboxymethyl cellulose (CMC) as a thickening agent, and acetylene black as a conductive auxiliary material were measured at a mass ratio of 96:2:1:1. As the SBR, a rubber particle dispersion (solids 40% by mass) was used, and used by measuring so that the solids of the binding material were at the above mass ratio.

Then, these were mixed with water to prepare a negative electrode slurry. The negative electrode slurry was applied to copper foil having a thickness of 10 m followed by heat treatment at 80° C. under a nitrogen atmosphere for 8 hours for drying. Then, the obtained negative electrode was stored in an environment having a dew point of −10° C. for 3 hours to obtain a negative electrode. Then, the amount of water in the negative electrode active material layer of the negative electrode was measured at a measurement temperature of 150 to 200° C. by a coulometric titration method using a Karl Fischer measuring instrument (manufactured by Mitsubishi Chemical Analytech Co., Ltd.). As a result of the measurement, the amount of water in the negative electrode active material layer was 346 ppm.

Example D2

A secondary battery was fabricated and evaluated as in Example A2 except that the negative electrode described in Example D1 was used instead of the negative electrode described in Example A1. The results are shown in Table 4.

Example D3

A secondary battery was fabricated and evaluated as in Example A5 except that the negative electrode described in Example D1 was used instead of the negative electrode described in Example A1. The results are shown in Table 4.

Example D4

A secondary battery was fabricated and evaluated as in Example A6 except that the negative electrode described in Example D1 was used instead of the negative electrode described in Example A1. The results are shown in Table 4.

Example D5

A secondary battery was fabricated and evaluated as in Example A7 except that the negative electrode described in Example D1 was used instead of the negative electrode described in Example A1. The results are shown in Table 4.

Example D6

A secondary battery was fabricated and evaluated as in Example A8 except that the negative electrode described in Example D1 was used instead of the negative electrode described in Example A1. The results are shown in Table 4.

Example D7

A secondary battery was fabricated and evaluated as in Example A9 except that the negative electrode described in Example D1 was used instead of the negative electrode described in Example A1. The results are shown in Table 4.

Example D8

A secondary battery was fabricated and evaluated as in Example B2 except that the negative electrode described in Example D1 was used instead of the negative electrode described in Example A1. The results are shown in Table 4.

Example D9

A secondary battery was fabricated and evaluated as in Example B5 except that the negative electrode described in Example D1 was used instead of the negative electrode described in Example A1. The results are shown in Table 4.

Example D10

A secondary battery was fabricated and evaluated as in Example C2 except that the negative electrode described in Example D1 was used instead of the negative electrode described in Example A1. The results are shown in Table 4.

Example D11

A secondary battery was fabricated and evaluated as in Example C5 except that the negative electrode described in Example D1 was used instead of the negative electrode described in Example A1. The results are shown in Table 4.

Comparative Example D1

A secondary battery was fabricated and evaluated as in Comparative Example A4 except that the negative electrode described in Example D1 was used instead of the negative electrode described in Example A1. The results are shown in Table 4.

Comparative Example D2

A secondary battery was fabricated and evaluated as in Comparative Example A6 except that the negative electrode described in Example D1 was used instead of the negative electrode described in Example A1. The results are shown in Table 4.

Comparative Example D3

A secondary battery was fabricated and evaluated as in Comparative Example B2 except that the negative electrode described in Example D1 was used instead of the negative electrode described in Example A1. The results are shown in Table 4.

Comparative Example D4

A secondary battery was fabricated and evaluated as in Comparative Example B4 except that the negative electrode described in Example D1 was used instead of the negative electrode described in Example A1. The results are shown in Table 4.

Comparative Example D5

A secondary battery was fabricated and evaluated as in Comparative Example C2 except that the negative electrode described in Example D1 was used instead of the negative electrode described in Example A1. The results are shown in Table 4.

Comparative Example D6

A secondary battery was fabricated and evaluated as in Comparative Example C4 except that the negative electrode described in Example D1 was used instead of the negative electrode described in Example A1. The results are shown in Table 4.

TABLE 4

| | First solution | | | Second solution | | | Electrolytic solution | | | Volume | Capacity |
|---|---|---|---|---|---|---|---|---|---|---|---|
| | Halogen-containing compound | Content (% by mass) | Amount injected (mL) | Halogen-containing compound | Content (% by mass) | Amount injected (mL) | Halogen-containing compound | Content (% by mass) | Total amount (mL) | increase rate (%) | retention rate (%) |
| Example D1 | — | — | 4.0 | FC1 | 6.0 | 1.0 | FC1 | 1.2 | 5.0 | 100 | 91.2 |
| Example D2 | — | — | 4.0 | FC1 | 10.0 | 1.0 | FC1 | 2.0 | 5.0 | 100 | 92.4 |
| Example D3 | — | — | 4.0 | FC2 | 10.0 | 1.0 | FC2 | 2.0 | 5.0 | 101 | 91.3 |
| Example D4 | — | — | 4.0 | FC3 | 10.0 | 1.0 | FC3 | 2.0 | 5.0 | 101 | 91.9 |
| Example D5 | — | — | 4.0 | FC4 | 10.0 | 1.0 | FC4 | 2.0 | 5.0 | 101 | 90.7 |
| Example D6 | — | — | 4.0 | FC5 | 10.0 | 1.0 | FC5 | 2.0 | 5.0 | 100 | 90.2 |
| Example D7 | — | — | 4.0 | FC6 | 10.0 | 1.0 | FC6 | 2.0 | 5.0 | 101 | 90.6 |
| Example D8 | — | — | 4.0 | FE1 | 10.0 | 1.0 | FE1 | 2.0 | 5.0 | 101 | 90.8 |
| Example D9 | — | — | 4.0 | FE4 | 10.0 | 1.0 | FE4 | 2.0 | 5.0 | 100 | 90.1 |
| Example D10 | — | — | 4.0 | FES1 | 10.0 | 1.0 | FES1 | 2.0 | 5.0 | 102 | 88.5 |
| Example D11 | — | — | 4.0 | FES4 | 10.0 | 1.0 | FES4 | 2.0 | 5.0 | 102 | 89.0 |
| Comparative Example D1 | — | — | — | — | — | — | FC1 | 2.0 | 5.0 | 108 | 79.2 |
| Comparative Example D2 | — | — | — | — | — | — | FC4 | 2.0 | 5.0 | 109 | 80.4 |
| Comparative Example D3 | — | — | — | — | — | — | FE1 | 2.0 | 5.0 | 112 | 76.9 |
| Comparative Example D4 | — | — | — | — | — | — | FE4 | 2.0 | 5.0 | 115 | 75.1 |
| Comparative Example D5 | — | — | — | — | — | — | FES1 | 2.0 | 5.0 | 113 | 73.9 |
| Comparative Example D6 | — | — | — | — | — | — | FES4 | 2.0 | 5.0 | 115 | 73.1 |

This application claims the right of priority based on Japanese Patent Application No. 2013-255971 filed on Dec. 11, 2013, the entire disclosure of which is incorporated herein by reference.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

INDUSTRIAL APPLICABILITY

The secondary battery according to the exemplary embodiment can be applied, for example, to driving equipment such as electric vehicles, plug-in hybrid vehicles, electric motorcycles, and electrically assisted bicycles, tools such as electric tools, electronic equipment such as portable terminals and notebook computers, and storage batteries such as home electricity storage systems and solar power generation systems.

REFERENCE SIGNS LIST 1 positive electrode active material layer
2 negative electrode active material layer
3 positive electrode current collector
4 negative electrode current collector
5 separator
6 laminate outer package
7 laminate outer package
8 negative electrode tab
9 positive electrode tab
103 positive electrode terminal
104 negative electrode terminal
111 outer package
113 positive electrode
114 negative electrode
115 separator
118 stack
123 positive electrode lead
124 negative electrode lead

The invention claimed is:

1. A method for producing a secondary battery comprising an electrolytic solution comprising a supporting salt, a nonaqueous solvent, and a halogen-containing compound, an electrode assembly comprising a negative electrode and a positive electrode, and an outer package, the method comprising:
  (1) disposing a first solution comprising at least the supporting salt and the nonaqueous solvent, and the electrode assembly in the package;
  (2) charging the electrode assembly;
  (3) emitting from the package a gas generated by the charge; and
  (4) injecting a second solution comprising at least the halogen-containing compound into the package after the gas is emitted,
  wherein the first solution does not comprise the halogen-containing compound, and
  the electrolytic solution comprises the first solution and the second solution.

2. The method for producing a secondary battery according to claim 1, wherein the halogen-containing compound is at least one selected from the group consisting of a halogen-containing carbonate compound, a halogen-containing ether compound, and a halogen-containing ester compound.

3. The method for producing a secondary battery according to claim 1, wherein the halogen-containing compound is a halogen-containing carbonate compound.

4. The method for producing a secondary battery according to claim 1, wherein the halogen-containing compound is a halogen-containing ether compound.

5. The method for producing a secondary battery according to claim 1, wherein the halogen-containing compound is a halogen-containing ester compound.

6. The method for producing a secondary battery according to claim 2, wherein the halogen-containing carbonate compound is represented by the following formula (1-1) or the following formula (1-2):

[Formula 1]

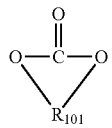

(1-1)

wherein $R_{101}$ is a fluorine-substituted alkylene group or a fluorine-substituted alkenylene group;

[Formula 2]

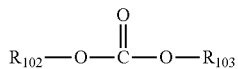

(1-2)

wherein $R_{102}$ and $R_{103}$ each independently represent an alkyl group or a fluorine-substituted alkyl group, and at least one of $R_{102}$ and $R_{103}$ is a fluorine-substituted alkyl group.

7. The method for producing a secondary battery according to claim 2, wherein the halogen-containing ether compound is represented by the following formula (2-1) or the following formula (2-2):

[Formula 3]

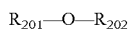

(2-1)

wherein $R_{201}$ and $R_{202}$ each independently represent an alkyl group or a fluorine-substituted alkyl group, and at least one of $R_{201}$ and $R_{202}$ is a fluorine-substituted alkyl group;

[Formula 4]

(2-2)

wherein $R_{203}$ represents a fluorine-substituted alkylene group that may comprise one ether group disposed between carbon atoms.

8. The method for producing a secondary battery according to claim 2, wherein the halogen-containing ester compound is represented by the following formula (3-1):

[Formula 5]

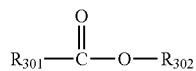
(3-1)

wherein $R_{301}$ and $R_{302}$ each independently represent an alkyl group or a fluorine-substituted alkyl group, and at least one of $R_{301}$ and $R_{302}$ is a fluorine-substituted alkyl group.

9. The method for producing a secondary battery according to claim 1, wherein the charge is performed until voltage reaches 2.3 V or more.

10. The method for producing a secondary battery according to claim 1, wherein a content of the halogen-containing compound in the second solution is 6.0% by mass or more.

11. The method for producing a secondary battery according to claim 1, wherein the second solution further comprises the supporting salt and the nonaqueous solvent in addition to the halogen-containing compound.

12. The method for producing a secondary battery according to claim 1, wherein a content of the halogen-containing compound in the electrolytic solution is 0.1 to 10% by mass.

13. The method for producing a secondary battery according to claim 1, wherein the negative electrode comprises a negative electrode active material layer, the negative electrode active material layer comprises a negative electrode active material and a negative electrode binding agent, and the negative electrode binding agent is a water-dispersible polymer.

14. The method for producing a secondary battery according to claim 1, wherein the positive electrode comprises a positive electrode active material layer, the positive electrode active material layer comprises a positive electrode active material and a positive electrode binding agent, and the positive electrode binding agent is a water-dispersible polymer.

15. The method for producing a secondary battery according to claim 1, comprising a step of discharging after the step (2) and before the step (4).

16. The method for producing a secondary battery according to claim 1, wherein the secondary battery is a stacked laminate type.

17. A secondary battery fabricated by the method for producing a secondary battery according to claim 1.

* * * * *